United States Patent [19]

Brown et al.

[11] Patent Number: 4,890,524

[45] Date of Patent: Jan. 2, 1990

[54] TRIM PRESS WITH COUNTERBALANCE

[75] Inventors: Gaylord W. Brown, Punta Gorda, Fla.; Albert Arends, Gladwin, Mich.

[73] Assignee: John Brown Inc.

[21] Appl. No.: 238,525

[22] Filed: Aug. 31, 1988

[51] Int. Cl.⁴ .............................................. B26D 5/18
[52] U.S. Cl. ...................................... 83/615; 83/628; 83/632; 83/97; 83/748
[58] Field of Search .................. 83/615, 632, 628, 748, 83/97; 74/589, 590, 591, 603, 602, 604

[56] References Cited

U.S. PATENT DOCUMENTS

| | | | |
|---|---|---|---|
| 4,313,358 | 2/1982 | Brown | 83/97 |
| 4,391,171 | 7/1983 | Wendt | 83/97 |
| 4,630,516 | 12/1986 | Koch et al. | 83/615 |

Primary Examiner—Frank T. Yost
Assistant Examiner—Thomas Hamill Jr.
Attorney, Agent, or Firm—B. W. Norton

[57] ABSTRACT

A trim press for severing articles differentially pressure formed in a thermoplastic sheet comprising a stationary die member and a movable trim die member mounted on a frame for movement toward and away from the stationary trim die member between a spaced apart position and a closed position in which the trim die members engage opposite sides of a sheet to sever the article from the sheet. Dynamically balanced drive mechanism is provided for moving the platen in a to-and-fro path of travel while concurrently oppositely moving a counterbalance weight movably mounted on the frame.

20 Claims, 2 Drawing Sheets

4,890,524

TRIM PRESS WITH COUNTERBALANCE

BACKGROUND OF THE INVENTION

1. FIELD OF THE INVENTION

This invention relates to a trim press for severing articles from a sheet of thermoplastic material in which articles have been differentially pressure formed and more particularly to a trim press including stationary and movable trim dies assemblies, and dynamically balanced mechanism for moving the movable die assembly in a to-and-fro path of travel toward and away from the stationary die assembly such that the die assemblies periodically engage opposite sides of a sheet of plastic material to sever the articles from the sheet.

2. DESCRIPTION OF RELATED ART

Apparatus, such as that diclosed in U.S. Pat. No. 3,664,791 granted to G. W. Brown on May 23, 1972, has been provided heretofore for successively delivering a heated thermoplastic sheet to a sheet heating station and then to a forming station at which opposed molds engage the sheet to differentially pressure form articles in the sheet. Apparatus constructed according to the present invention is particularly directed to new and novel apparatus for trimming articles such as that disclosed in the aforementioned Brown patent, from the plastic sheet.

Prior art trim presses typically include one stationary platen and one movable platen mounting opposed trim dies which engage opposite sides of the sheet to trim the articles from the sheet. Trim presses have been used for many years for trimming plastic parts formed in a continuous web of material from a forming machine with parts delivered to a horizontal table. Such presses are typically capable of operating at speeds slightly above 100 strokes per minute.

As thermoforming technology improves and thermoforming speeds increase, it has become necessary to run trim presses at higher rates of speeds. Accordingly, it is an object of the present invention to provide a trim press of the type described which has increased trim speed capacity.

It has been found that increased operational speeds can be obtained with appropriate counterbalancing to dynamically balance the moving trim die assembly. Accordingly, it is another object of the present invention to provide a new and novel dynamically balanced trim press.

It is another object of the present invention to provide a trim press of the type described which includes new and novel counterbalancing mechanism for counterbalancing a moving trim die assembly.

In one known attempt to counterbalance a moving die assembly, a balance platen has been mounted on the machine frame for reciprocal to-and-fro movement in a direction opposite to that of the movable. The balance platen was installed between the movable platen and the rotatable drive mechanism and unduly restricted the space available for mechanical ejectors and other auxiliary mechanism. A dynamically balanced trim press is also disclosed in U.S. Pat. No. 4,313,358 issued to Gaylord W. Brown on Feb. 2, 1982. This latter Brown patent, however, discloses two trim die assemblies which are concurrently, oppositely movable toward and away from each other to accomplish the dynamic balancing.

In the prior art trim presses including one stationary platen and one movable platen, the maximum speeds of operation and output are severely limited. Accordingly, it is yet another object of the present invention to provide a new and novel trim press including a stationary trim die assembly and a dynamically balanced movable trim die assembly.

Still another object of the present invention to provide a trim press of the type described including a movable trim die assembly and a drive system for the movable trim die assembly including a counterbalanced weight movably mounted on the frame and a rotatable drive system which is coupled to and concurrently drives the trim die assembly and the counterbalance in opposite to-and-fro directions of travel.

It is a further object of the present invention to provide a trim press of the type described wherein a movable trim die platen and a counterbalance weight are moved in opposite directions via a drive system having a rotatable shaft disposed between the counterbalance weight and the platen.

It is a still further object of the present invention to provide a new and novel trim press of the type described including a movable trim die assembly, a movable counterbalance, and drive system including a drive shaft rotatable on an axis, and a pair of coupling members oppositely eccentrically coupled to the drive shaft for oppositely driving the counterbalance and the platen in opposite directions.

Another object of the present invention is to dynamically balance existing presses without restricting the amount of space that could be used for mechanical ejectors and other auxiliary mechanisms.

Another object of the present invention is to provide an apparatus, for dynamically balancing trim presses of the type described, which is easily constructed and installed and may be retrofitted to existing trim presses in the field without requiring modification of the existing presses and press frames.

It is another object of the present invention to provide a dynamically balanced trim press having a stationary platen and a movable platen which will allow press feeds of up to 175 strokes per minute with existing presses.

Other objects and advantages of the present invention will become apparent to those of ordinary skill in the art as the description thereof proceeds.

SUMMARY OF THE INVENTION

A balanced trim press for severing articles differentially pressure formed in a sheet of thermoplastic material comprising: a frame; a stationary platen mounted on the frame; a movable platen mounted on the frame for reciprocal movement in a to-and-fro path; opposed trim dies mounted on the platens; dynamically balanced drive mechanism for moving the movable platen between a remote position and a closed position in which the dies engage opposite sides of a sheet of plastic material to sever the articles from the sheet.

BRIEF DESCRIPTION OF THE DRAWINGS

The invention may be more readily understood by referring to the accompanying drawings, in which.

DESCRIPTION OF THE PREFERRED EMBODIMENT

Figure 1:
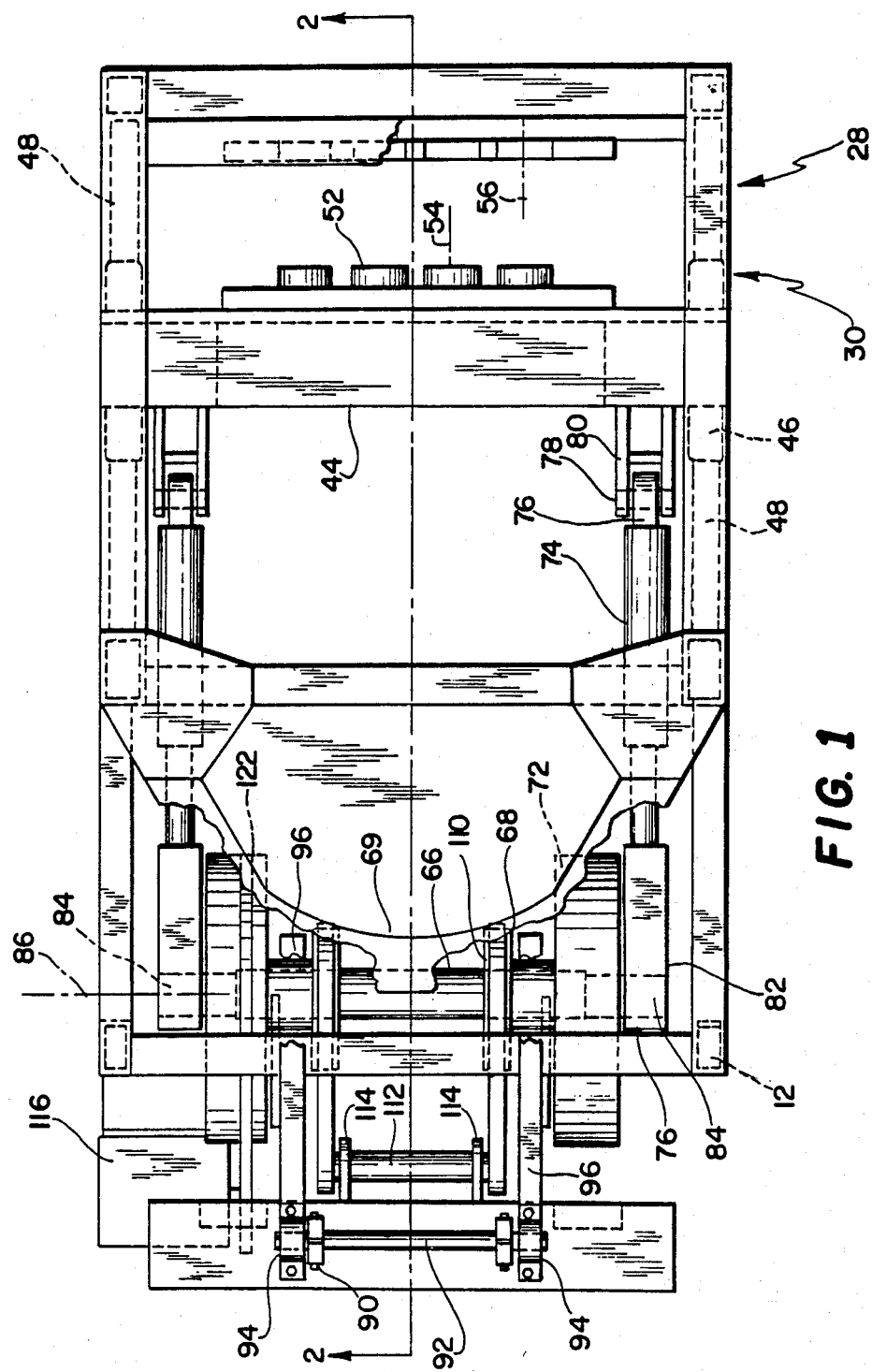
FIG. 1 is a top plan view of a trim press constructed according to the present invention.

Trim press apparatus constructed according to the present invention is generally designated 10 and includes a frame, generally designated F, comprising laterally spaced apart upstanding posts 12 mounting laterally spaced apart pairs of upper, intermediate, and lower rails 14, 16, 18 spanned by transverse frame members 20, 22, and 24.

The trim press 10 is particularly adapted for severing articles, generally designated A, which have been differentially pressure formed in a sheet S of thermoplastic material by thermoforming apparatus, such as that disclosed in the aforementioned U.S. Pat. No. 3,664,791, which is incorporated herein by reference. The articles A may suitably comprise thermoformed, thermoplastic cups and the like, conventionally used in coffee vending machines.

The trim press 10 includes sheet feed mechanism, generally designated 24, for successively vertically downwardly indexing the sheet S to a trim station, generally designated 26. The sheet feed mechanism 24' may be identical to that diclosed in U.S. Pat. No. 4,313,358, which is incorporated herein by reference.

The trim press includes a stationary trim die assembly, generally designated 28, and a movable trim die assembly, generally designated 30.

The stationary trim die assembly 28 includes horizontally disposed, transverse, stationary platen 32 mounted on frame member 24. The stationary platen 32 mounts a stationary trim die 34 having a plurality of die openings or cutouts 36 which receive the severed articles A and include an annular knife edge 38 which bears against the side 40 of sheet S. The articles A, after being severed from the sheets, pass through the stationary die openings 36 and are stacked, as illustrated at 42, in nested relation with previously severed articles A.

The movable trim die assembly 30 includes a movable platen 44 having a pair of guide sleeves 46 slidably, reciprocally mounted on a pair of longitudinally extending, laterally spaced apart guide rods 48.

The movable platen 44 includes a base 50 mounting a movable trim die 51 having a plurality of rearwardly extending, hollow cylindrical trim die punches 52. The trim die punches 52 include axes 54 axially aligned with the axes 56 of the stationary trim die openings 36.

Figure 2:
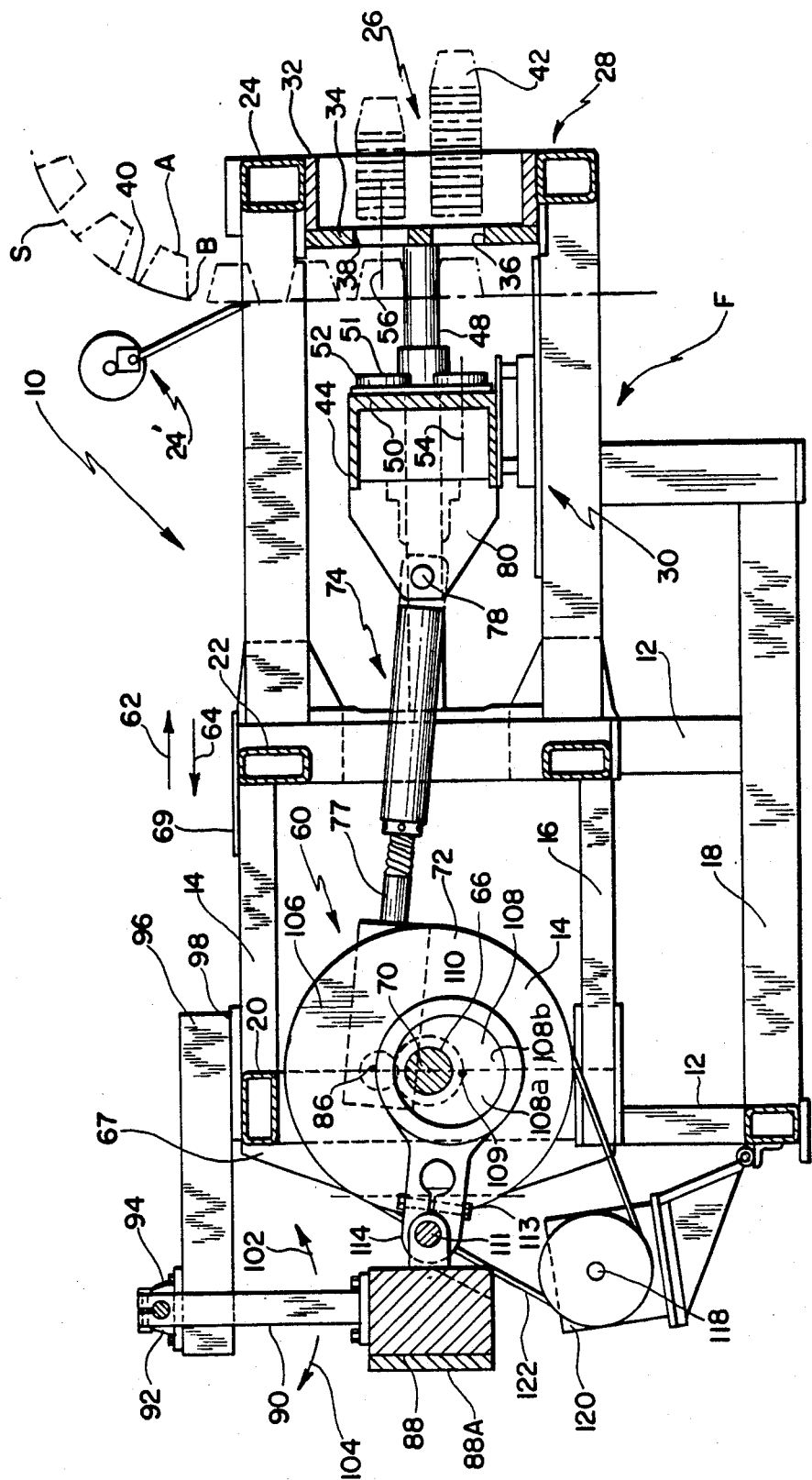
FIG. 2 is a sectional side elevational view taken along the line 2—2 of FIG. 1.

A dynamically balanced drive mechanism, generally designated 60, is provided for reciprocating the movable trim die assembly 30, in a to-and-fro path of travel represented by the arrows 62 and 64, between a remote position, illustrated in FIG. 2, and a closed position in which a sheet S is clamped between the die members 52 and 38 to sever articles A along their borders b from the sheet S at the trim station 26.

The drive apparatus 60 includes a horizontal, transverse drive shaft 66 journaled on a pair of laterally spaced apart frame supported bearing blocks 68. The blocks 68 are mounted on vertical frame plates 67 depending from a generally C-shaped frame plate 69 supported atop fram bars 14. The shaft 66 has a rotational axis 70 and mounts a pair of axially spaced apart flywheels 72 which are concentric with the shaft 70.

The movable die assembly 30 is coupled to the flywheels 72 via a pair of laterally spaced apart coupling rods, generally designated 74, each having one end 76 pivotally connected via a pivot pin 78 to a clevis 80 mounted on the movable platen 44. The opposite end 82 of each coupling rod 74 is adjustably threadedly coupled to coupling rod end 76 at 77 and is journaled on a crank pin 84 extending laterally outwardly from the flywheels 72. The crankpins 84 each have an axis 86 which is parallel to, but eccentrically spaced, radially outwardly from the drive shaft axis 70. As the shaft 66 rotates, the crankpins 84 follow an eccentric path relative to the rotational axis 70 and the coupling rods 74 drive the movable trim die assembly 30 in the to-and-fro path, represented by the arrows 62, 64. The stroke of the movable die assembly 30 may be adjusted by threadedly adjusting the relative positions of the coupling rod ends 76 and 82.

To counterbalance the movable die assembly 30, a counterbalance weight 88 is pivotally mounted on the frame F via a pair of arms 90 fixed to a shaft 92 which is journaled on bearing blocks 94. The bearing blocks 94 are mounted atop a pair of longitudinally rearwardly extending arms 96 which are welded or otherwise suitably fixed to the frame F at 98.

The counterbalance weight 88 comprises a pendulum which is swingable in a to-and-fro path of travel represented by the arrows 102, 104. Additional weights 88a may be added to the pendulum 88 to adjust for longer strokes of movable die assembly 30.

Apparatus, generally designated 106, is provided for swinging the pendulum 88 and includes a pair of eccentrics, 108 comprising a pair of split disk halves 108a, 108b fixed to the shaft 66 eccentrically.

Journaled on the eccentric discs 108 is a band or strap 110 which is fixed to a split connector 111. Connector 111 is clamped, via threaded bolt 113 to a pivot pin 112 which is journaled on a pair of ears 114 fixed to the counterbalanced weight 88. The drive shaft 66 is driven via a drive motor, generally designated 116, having a drive shaft 118 and a pulley 120. A drive belt 122 is trained around the drive pulley 120 and one of the flywheels 72.

The axis 109 of eccentric discs or plates 108 is 180° out of phase with the axis 86 of crank pin 84 so that the eccentric 108 drives the counterbalance weight or pendulum 88 in a direction opposite to the direction of movement of the movable trim die assembly 30. When the trim die assembly 30 is moving forwardly in the direction of the arrow 62, the pendulum 88 is swinging rearwardly in the direction of the arrow 104 and when the movable platen 64 is moving rearwardly in the direction of the arrow 64, the trim die assembly 30 is moving forwardly in the direction of the arrow 102.

THE OPERATION

A thermoplastic sheet S, having a plurality of laterally and longitudinally spaced articles A thermoformed therein, is vertically downwardly fed into the machine. It will be assumed that the feed assembly 24 has been operated to move the sheet S downwardly to a position in which the articles A are axially aligned with the die knife members 38 and punches 52 at the trim die station 26. At this time, the movable die assembly 30 is in its position spaced from the stationary die assembly 28 as illustrated in FIG. 2.

As the drive assembly 60 continues to operate, the die punches 52 will be driven towards the sheet S and will force the sheet S between the punches 52 and die knives 38 such that the die knives 38 and punches 52 will engage opposite sides of the sheet S to sever the sheet S along the borders b to separate the articles A, positioned at the trim station 26 from the sheet S.

The trim die assembly 30 is then moved in a direction away from the stationary die assembly 28 and the feed assembly 24 is again operated in timed relation to index the sheet S downwardly to align the next succeeding set of articles A with the now separated trim die assemblies 28 and 30. The operation will continue to be repeated.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What we claimed is:

1. A trim press for severing articles which have been differentially pressure formed in a thermoplastic sheet comprising:
    a frame;
    a pair of trim platens, including a pair of trim dies, mounted on said frame;
    one of said trim platens being movably mounted on said frame for movement between a removed position and a closed position in which said trim dies engage opposite sides of a thermoplastic sheet to sever an article from said sheet;
    means for reciprocably moving said one trim platen between said removed position and said closed position including;
    a rotatable drive shaft, having a rotational axis;
    means for rotating said drive shaft;
    coupling rod means pivotally coupled to said one platen and eccentrically coupled to said rive shaft for moving said one platen in a to-and-fro path of travel between said removed position and said closed position as said shaft rotates; and
    balance means comprising
    a counterbalance weight;
    means mounting said counterbalance weight on said frame for to-and-fro movement on said frame; and
    means pivotally coupled to said counterbalance weight and eccentrically coupled to said drive shaft for moving said counterbalance weight in a direction opposite to, but concurrent with, the to-and-fro movement of said one platen;
    said drive shaft being disposed between said counterweight and said one movable platen.

2. The trim press set forth in claim 1 wherein said counterbalance weight is mounted on said frame for swinging movement about a second axis and said rotational axis is disposed between said one platen and said second axis.

3. The trim press set forth in claim 1 including flywheel means mounted on said drive shaft.

4. The trim press set forth in claim 3 including a crankpin on said flywheel means radially outwardly of said rotational axis; said coupling rod means being coupled to said crankpin.

5. The trim press set forth in claim 4 wherein said flywheel means includes first and second axially spaced apart flywheel mounted on said drive shaft and said second coupling means is eccentrically coupled to a portion of said drive shaft between said first and second flywheels.

6. The trim press set forth in claim 4 wherein said second coupling means includes a disc eccentrically fixed to said shaft for rotation therewith and a circular band journaling said disc; and means pivotally coupling said circular band to said counterbalance weight.

7. The trim press set forth in claim 6 wherein said plates are cylindrical and include an axis which is displaced 180° about said rotational axis relative to said crankpin.

8. The trim press set forth in claim 6 wherein said counterbalance weight comprises adjustable weight means.

9. A dynamically balanced trim press comprising:
    a frame;
    rotatable drive means having a rotational axis;
    a trim die member mounted on said frame for to-and-fro reciprocal movement between a removed position spaced from a trim station and a closed position at said trim station;
    first eccentric means coupled to said trim die member and to said drive shaft for moving said trim die member in said to-and-fro path of travel as said rotatable drive means rotates; and
    dynamic balance means comprising a counterbalance weight mounted on said frame for to-and-fro reciprocal movement; and
    second eccentric means coupled to said counterbalance weight and eccentrically coupled to said rotatable drive means for concurrently driving said counterbalance weight in a substantially to-and-fro direction opposite the to-and-fro direction of movement of said trim die member;
    said rotational axis being disposed between said counterbalance weight and said trim die member.

10. The trim press set forth in claim 9 including means mounting said counterbalance weight on said frame for to-and-fro swinging movement about a second axis.

11. The trim press set forth in claim 9 wherein said rotatable drive means includes a rotatable drive shaft rotating on said rotational axis and flywheel means fixed thereto; said first eccentric means being eccentrically coupled to said flywheel means.

12. The trim press set forth in claim 11 wherein second eccentric means includes a crank arm extending in a direction away from said trim die member.

13. The trim press set forth in claim 12 wherein said flywheel means comprises a pair of flywheels fixed to said rotatable drive shaft and said second eccentric means includes a pair of eccentrics disposed between said flywheels.

14. A dynamically balanced trim press for severing articles formed in a sheet of plastic comprising:
    a frame;
    a stationary platen mounted on said frame;
    a movable platen mounted on said frame for reciprocal movement in a to-and-fro path;
    first and second opposed trim dies, mounted on said stationary platen and said movable platen;
    dynamically balanced drive means, including counterbalance weight means mounted for to-and-fro movement on said frame, for moving said movable platen between a removed position and a closed position in which said dies engage opposite sides of a sheet of plastic material to sever the articles from said sheet; and
    means disposed between and coupled to said movable platen and said counterbalance weight means for concurrently driving said counterbalance weight means and said movable platen in opposite to-and-fro directions of travel.

15. The dynamically balanced press set forth in claim 14 wherein said means for moving said movable platen includes;

rotatable drive means having a rotational axis;

first coupling means, eccentrically coupled to said rotatable drive means and pivotally coupled to said movable platen;

second coupling means, eccentrically coupled to said rotatable drive means and extending in a direction away from said movable platen and pivotally coupled to said counterbalance weight means.

16. The dynamically balanced trim press set forth in claim 15 wherein said first and second coupling means, include coupling members which are oppositely eccentric relative to said axis.

17. The dynamically balanced trim press set forth in claim 16 wherein said counterbalance weight means comprises a pendulum, and means pivotally mounted said pendulum on said frame for swinging movement.

18. The dynamically balanced trim press set forth in claim 15 wherein said rotational axis is disposed between said counterbalance weight means and said movable platen.

19. The dynamically balanced trim press forth in claim 18 wherein said rotatable drive means includes a rotatable drive shaft rotatable on said rotational axis and flywheel means fixed to said drive shaft.

20. The dynamically balanced trim press set forth in claim 19 wherein said flywheel means includes a pair of axially spaced apart flywheels fixed to said drive shaft;

said second coupling means being eccentrically coupled to a portion of said drive shaft between said flywheels.

* * * * *